No. 718,780. PATENTED JAN. 20, 1903.
A. B. MARSH.
CULTIVATOR.
APPLICATION FILED MAY 19, 1902.
NO MODEL.
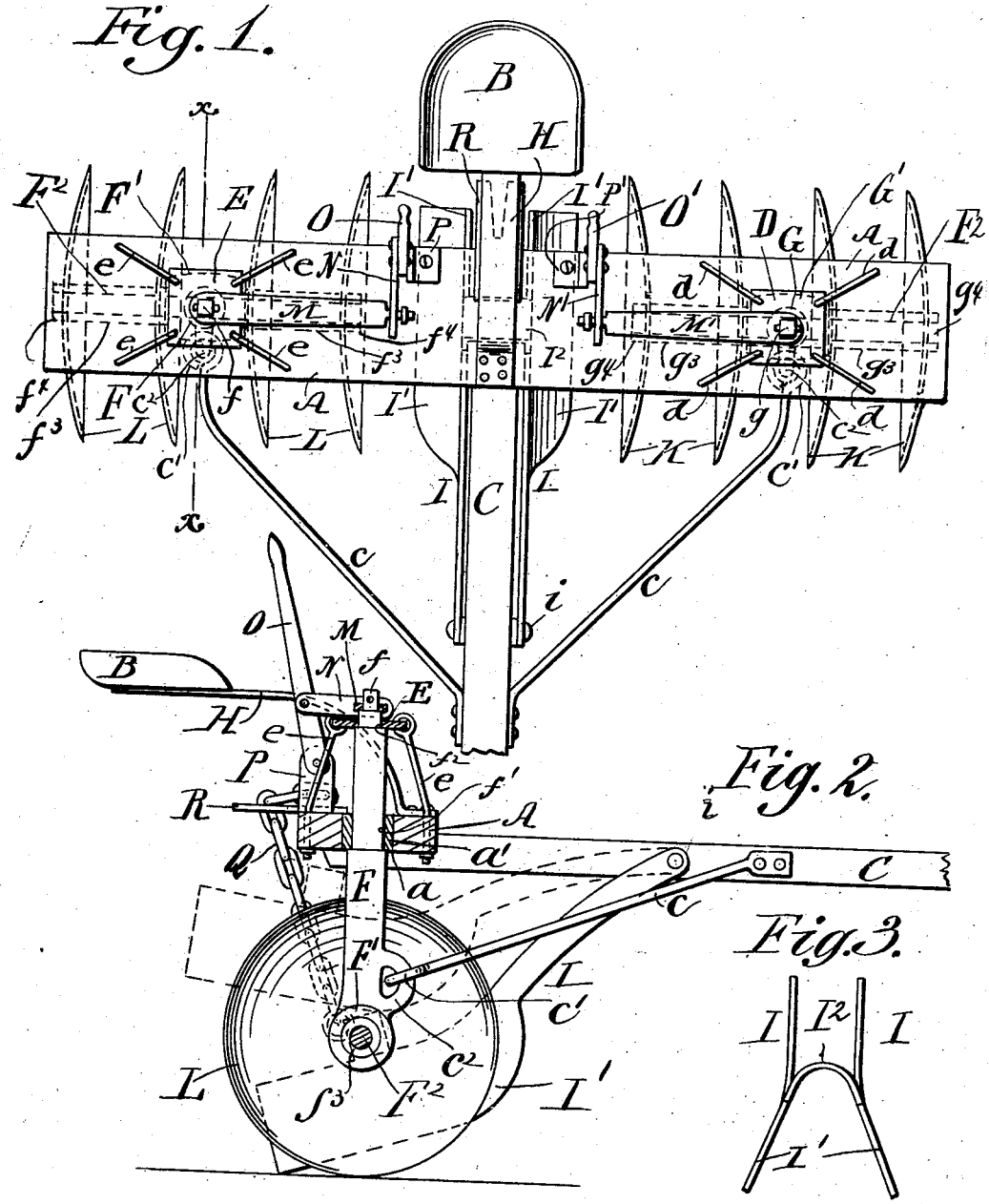

UNITED STATES PATENT OFFICE.

ALPHEUS BUTLER MARSH, OF WHITMAN, KANSAS.

CULTIVATOR.

SPECIFICATION forming part of Letters Patent No. 718,780, dated January 20, 1903.

Application filed May 19, 1902. Serial No. 107,908. (No model.)

*To all whom it may concern:*

Be it known that I, ALPHEUS BUTLER MARSH, a citizen of the United States, and a resident of Whitman, county of Sumner, and State of Kansas, have invented certain new and useful Improvements in Cultivators, of which the following is a specification, reference being had to the accompanying drawings, forming a part thereof, in which similar letters of reference indicate corresponding parts.

This invention relates to that class of cultivators in which concave disks are used to loosen and stir the soil.

Many of the disk cultivators heretofore in use ould in spite of the utmost care when the corn or other plant to be cultivated had grown to be eight or nine inches high cut down the plant. It was always heretofore very difficult, if not quite impossible, to stir and loosen the ridges between the rows of corn to the bottom with any of the disk cultivators in use. These disadvantages, among others, greatly hindered and rendered difficult the cultivation of corn and such other plants as were planted in rows and whic had attained the height of eight or nine inches with disk cultivators. It is to obviate these difficulties that my present invention has been devised.

The nature of the invention consists in the combination and arrangement of the divers parts of the said cultivator, as will be more fully hereinafter described, and subsequently pointed out in the claims.

In the accompanying drawings, forming part of this specification, Figure 1 is a top plan view of my newly-invented cultivator. Fig. 2 is a sectional view in elevation, taken on the line $x$ $x$ of Fig. 1. Fig. 3 is a rear end detail view of the shield forming part of my invention.

A designates a horizontal beam which is to be of a suitable length relative to the distance between two alternate rows of corn.

C designates the tongue, and B the driver's seat. This seat is attached by the spring H to the horizontal beam A. In this beam A are formed two bearings, (designated by $a$.) In these bearings are set the metallic bushes $b'$. D and E designate metallic plates which are formed with bearings to register with the bearings in the same beam. These plates are held in proper position by the guy-rods $d$ and $e$. F G designate upright posts which are pivoted in the bearings in said beam and plates D E, as illustrated at $f'$ $f^2$. The tops $f$ of these posts are square, and on lem are fastened the levers M and M'. P and P' are brackets fastened on the said beam. On these are pivoted the levers O and O'. These levers are connected to the levers M and M' by the rods N and N', so that by moving the levers O and O' the posts F may be turned in their bearings. The shafts $F^2$ are journaled through the enlargements $F'$ $G'$ of the posts F G and held against lateral movement by means of collars $f^3$ $g^3$ and nuts $f^4$ $g^4$. The posts F G are each formed with a loop $c^2$, through which pass the eyes $c'$ of the brace-rods $c$, steadily holding said posts in upright position. On the shafts $F^2$ are revolubly mounted the cultivator-disks L L and K K, which are held against lateral movement by the collars $f^3$ $g^3$ and nuts $f^4$ $g^4$. In the example of my invention here given there are two of these shafts shown, and on each are illustrated four disks. Any suitable and convenient number may be used. These shafts with their gangs of disks are arranged so that they will work one on each side of a row of plants.

It is intended only to use this machine when the plants are comparatively small and that in use the machine shall straddle the row, working on both sides of it. This necessitates some means to prevent the clods from falling on the small plants and injuring them. For this purpose I provide the shield I, formed with the wings I' and the integral arched brace $I^2$. This is made of such a size that while the cultivator is in operation one wing may be on each side of the row, moving with the machine. It is detachably and pivotally connected to the tongue C by a bolt $i$, as illustrated. The chain Q is connected to the arched brace $I^2$ and arranged to raise up and let down the shield, so as to adjust its height as may be required, the free end of the said chain passing through the fork R, which extends rearwardly from the beam A, whereby any suitable link of the chain may be embraced to hold the shield in required position.

This cultivator when in use straddles the row it is cultivating, and while the disks stir up and loosen the ridges between the rows the shield moving along with the cultivator with its wings one on each side of the row prevents any clods from falling upon the tender plants to damage them. It will then be found that on account of the protection of the shield on the side and the proper length of the beam on the other side the disks will not cut down the plants and that the soil will be more deeply and thoroughly stirred and loosened than by any implement of this class now in common use. Aside from what is herein set forth this cultivator is used in the common and well-known way.

I do not strictly confine myself to the construction hereinbefore set forth, as it is obvious from the scope of my invention that I am entitled to slight structural variations.

Having now fully described what my invention is and how the same is used, I claim as new and desire to secure by Letters Patent—

1. In a cultivator, the combination with a horizontal beam, formed with bearings for the accommodation of upright posts, and means of traction for said cultivator; of upright posts, pivoted in said bearings, shafts below and parallel, to said horizontal beam, carried by said posts, and arranged to turn with them, plates formed with perforations, of proper size to fit upon the upper ends of said posts, and held in position over the top of said horizontal beam, guy-rods holding said plates in position, means for turning said posts, and a plurality of cultivating-disks on said shafts, arranged to stir and loosen the soil on both sides of a row of plants simultaneously.

2. In a cultivator, the combination with a horizontal beam, formed with bearings for upright posts, metallic bushes in said bearings, metallic plates formed with bearings registering with the bearings in said beam, and held in place above said beam, guy-bars so holding said plates in position, and means of traction for said cultivator; of upright posts pivoted in said bearings, in said beam, and plates, shafts, carried by said posts, below and parallel to said horizontal beam, a plurality of cultivating-disks on said shafts and means for turning said upright posts.

3. In a cultivator, the combination with a horizontal beam, formed with bearings for upright posts, plates also formed with bearings registering with the bearings in said beam, guy-rods holding said plates in position above said beam, and means of traction for said cultivator, of upright posts, pivoted in said bearings in said beam and plates, shafts carried by said posts, under and parallel to said horizontal beam, a plurality of cultivating-disks on said shafts, horizontal levers attached to the tops of said posts, brackets on said horizontal beam, levers pivotally mounted on said brackets, and bars connecting said pivoted levers and said horizontal levers, and said bars and said levers affording facility for turning said posts.

4. In a cultivator, the combination with a horizontal beam, formed with bearings for upright posts, plates formed with bearings registering with the bearings in said beam, guy-rods holding said plates in position above said beam, and means of traction for said cultivator, of upright posts, pivoted in said bearings, means for turning said posts, shafts carried by said posts, under and parallel to said horizontal beams, a plurality of cultivating-disks on each of said shafts, and the gangs of disks so arranged that they will cultivate rows of plants, by loosening and stirring the soil on both sides of the row at once, and shields formed with two wings, attached to said cultivator and arranged to act as clod-fenders, by moving with one wing on each side of said row, and simultaneously protecting both sides of said row of plants.

5. In a cultivator, the combination with a horizontal beam formed with bearings for upright posts, plates also formed with bearings registering with the bearings in said beam, guy-rods holding said plates in position, above said beam, and means of traction for said cultivator; of posts pivoted in said bearings and means for turning said posts, shafts carried by said posts, below and parallel to said horizontal beam, a plurality of cultivating-disks on each of said shafts arranged to loosen and stir the soil on both sides of a row of plants at once, a shield formed with two wings, and arranged by interposing its wings between the said gangs of disks, and said plants, to protect said plants on both sides at once, while being so cultivated; means for detachably attaching said shield to said cultivator, and means for adjusting the same when so attached thereto.

In testimony that I claim the foregoing as my invention I have signed my name, in presence of two witnesses, this 16th day of April, 1902.

ALPHEUS BUTLER MARSH.

Witnesses:
JOHN C. HATFIELD,
OSCAR L. BENNETT.